(12) United States Patent
Brown et al.

(10) Patent No.: US 9,895,649 B2
(45) Date of Patent: Feb. 20, 2018

(54) HIGH SOLIDS MAGNESIUM HYDROXIDE SEA WATER SLURRIES

(71) Applicant: Premier Magnesia, LLC, West Conshohocken, PA (US)

(72) Inventors: Joe Christopher Brown, Molino, FL (US); Jerry Elliott Rademan, Atlanta, GA (US); Peyton L. Pool, Sr., Royal Palm Beach, FL (US); Mark Alexander Shand, Arden, NC (US); James O. Williams, Port St. Joe, FL (US)

(73) Assignee: Premier Magnesia, LLC, Wayne, PA (US)

( * ) Notice: Subject to any disclaimer, the term of this patent is extended or adjusted under 35 U.S.C. 154(b) by 35 days.

(21) Appl. No.: 14/681,241

(22) Filed: Apr. 8, 2015

(65) Prior Publication Data

US 2015/0283499 A1    Oct. 8, 2015

Related U.S. Application Data

(60) Provisional application No. 61/976,577, filed on Apr. 8, 2014.

(51) Int. Cl.
*B01D 53/14* (2006.01)
*B01D 53/48* (2006.01)
*B01D 53/80* (2006.01)

(52) U.S. Cl.
CPC ......... *B01D 53/1493* (2013.01); *B01D 53/48* (2013.01); *B01D 53/80* (2013.01); *B01D 2253/112* (2013.01); *B01D 2257/30* (2013.01)

(58) Field of Classification Search
None
See application file for complete search history.

(56) References Cited

U.S. PATENT DOCUMENTS

| | | | | | |
|---|---|---|---|---|---|
| 2,458,847 | A | * | 1/1949 | Gloss | C01F 5/24 423/164 |
| 2,833,690 | A | * | 5/1958 | Entrekin | A61K 33/08 424/689 |
| 3,208,523 | A | * | 9/1965 | Coyle | E21B 21/003 166/292 |
| 3,220,947 | A | * | 11/1965 | Sawyer, Jr. | C09K 8/206 507/110 |
| 4,698,379 | A | * | 10/1987 | Nakaya | B82Y 30/00 423/635 |
| 5,906,804 | A | * | 5/1999 | Aral | C01F 5/14 423/265 |

* cited by examiner

*Primary Examiner* — Joseph D Anthony
(74) *Attorney, Agent, or Firm* — Jeffrey T. Placker; Holland & Knight LLP

(57) ABSTRACT

A high solids magnesium hydroxide slurry may be provided. The slurry may include a magnesium hydroxide compound and a carbohydrate-based viscosity control agent. The slurry may further include sea water as at least a portion of the liquid component. The high solids magnesium hydroxide slurry may be utilized in connection with exhaust scrubber systems for removing SOx and NOx compounds from exhaust gas emissions.

26 Claims, No Drawings

HIGH SOLIDS MAGNESIUM HYDROXIDE SEA WATER SLURRIES

CROSS-REFERENCE TO RELATED APPLICATIONS

This application claims the benefit of U.S. provisional patent application Ser. No. 61/976,577, filed on Apr. 8, 2014, the entire disclosure of which is incorporated herein by reference.

TECHNICAL FIELD

The present disclosure relates to the formation of relatively high solids magnesium hydroxide slurries, and more particularly to relatively high solids magnesium hydroxide slurries in sea water.

BACKGROUND

In October 2008 the Marine Environmental Protection Committee (MEPC) of the International Maritime Organization (IMO) agreed on the progressive reduction of maximum sulfur content in fuel used on board commercial vessels. The agreement on the reduction in sulfur content in fuel was added to the Marine Pollution (MARPOL) Annex VI Prevention of Air Pollution from Ships. The MARPOL Annex VI sets out limits on permitted SOx and NOx emissions from ship exhausts, and also sets out other limitations and/or prohibitions on emissions of ozone depleting substances from commercial vessels. MARPOL Annex VI, also establishes emission control areas (ECA) that establish more stringent standards for SOx, NOx, and particulate matter within the ECA's. The North America ECA is 200 nautical miles from North American (US and Canada) coast including US Caribbean territories and Hawaii, but excluding waters controlled by Cuba. The current European ECA's include the North Sea and the Baltic Sea, while in port, and if a ship is considered a passenger carrier (such as a cruise ship, ferry, etc.), the ECA is defined as that distance covered when departing from one European port to another European port.

According to the MARPOL Annex VI regulations added in October 2008, the maximum sulfur content in fuel used for commercial vessels is to be reduced from 1.0% to 0.1% on Jan. 1, 2015 in ECA areas. The sulfur content in fuel used for commercial vessels is also to be reduced from 3.5% to 0.5% in non-ECA areas on Jan. 1, 2020. Additionally, the MARPOL Annex VI regulations from October 2008 allowed for the use of exhaust scrubbers to reduce sulfur oxides emissions from commercial vessels to the same levels that would be achieved by lowering sulfur content in fuel itself.

In view of the current and planned stricter emission regulations, the commercial shipping industry has a few primary options available for achieving compliance with the MARPOL Annex VI air quality standards. The vessels subject to the MARPOL Annex VI air quality standards can be converted to utilize new fuel types that would satisfy the air quality standards. For example, it may be possible to retrofit ships to burn liquefied natural gas (LNG) as an alternative to the currently used marine fuel. However, such a change would likely prove to be extremely expensive, and it is not considered to provide a satisfactory level of safety. As an alternative to converting vessels to use a different fuel type, lower sulfur content grades of conventional marine fuels may be used. However, such lower sulfur content fuels may be much more costly than the conventional, higher sulfur marine fuels. Additionally, it may be necessary to undertake various equipment retrofits, modifications, or replacements to allow suitable use with the lower sulfur fuels. Such equipment changes or replacements would further increase the cost of operation, in addition to the higher cost of the lower sulfur marine fuels. Another option for satisfying the air quality standards includes capturing, or removing, sulfur gasses from the engine exhaust to meet the required standards. Typically, exhaust scrubbers may be utilized for removing unwanted components (such as sulfur gasses) from exhaust emissions. The use of scrubbers may allow higher sulfur fuels (which may be relatively less expensive) to be used with existing engines and equipment. The scrubbers may be added to the systems downstream from the engines. As such, the use of scrubbers may provide a comparatively cost effective approach to achieving the necessary air quality standards.

Many typical scrubbers are very large in size, and, therefore, may take up valuable space on ocean-going vessels. For this reason, there has been a great deal of interest in newer scrubber technologies that may provide smaller scrubbers that demand less space. Some of the smaller scrubbers may be comparable in size to current engine silencers installed on ocean vessels. The newer scrubbers, as are typical of other designs, generally have two different modes of operation: open loop and closed loop. During open loop operation, the scrubber may take sea water from the vessel's sea water chest, and may run the sea water through the scrubber once and then discharge the sea water back into sea. The open loop operation is generally used when the vessel is 12.5 nautical miles, or further, from shore. When the vessel is closer to shore, the scrubber may be operated in the closed loop mode. During closed loop operation, a scrubber liquor is circulated through the scrubber to remove the undesired components from the exhaust emissions. As the scrubber liquor is circulated, additional alkali may be added as necessary. Solids may be removed from the circulated scrubber liquor via centrifuge operation, or other suitable operation. The scrubber may typically use the closed loop operation when the vessel is 12.5 nautical miles or closer to shore and while docked in-port.

Capturing the sulfur compounds removed from the exhaust emissions by the scrubber typically uses relatively higher pH compounds such as sodium hydroxide (NaOH). The relatively higher pH compounds may act to neutralize acid formed by the combination of sulfur dioxide and water. For example, sulfuric acid may be generated by the scrubber capturing sulfur dioxide gases and converting them to a liquid phase (sulfuric acid). NaOH, which also is commonly known as caustic soda, is used by some marine companies today as the preferred alkali in closed loop scrubber systems. However, such a scrubber system may be somewhat dangerous, as leakage or spillage of liquid NaOH can cause a major safety problem due to its highly caustic nature. Safety concerns associated with NaOH exposure may be especially pronounced passenger ships, for example, which may carry passengers who may not aware of, or trained to handle, the potential hazards. Some commercially available wet scrubber systems may typically use caustic soda (NaOH) as the alkali source. A smaller number of dry scrubber systems have also been introduced. The dry scrubber systems typically use lime or hydrated lime products as the alkali source Scrubber systems utilizing NaOH as the alkali source generally require ship owners to dedicate additional space for scrubber installation. The required space generally results in a decrease in the usable staterooms and/or cargo space available on the vessel. The loss of stateroom and/or cargo space may become a major financial burden when considering that cabin spaces are at a premium, and cruise-liners want to make this space available for as many passenger staterooms as possible. For example, a single stateroom may yield annual revenues in the hundreds of thousands of U.S. dollars on most cruise ships.

SUMMARY

According to an implementation, a composition may include a slurry that may include a magnesium hydroxide compound. The slurry may also include sea water. The slurry may further include a carbohydrate-based viscosity control agent.

One or more of the following features may be included. The magnesium hydroxide compound may include powdered magnesium hydroxide. The magnesium hydroxide compound may include hydrated magnesium oxide.

The carbohydrate-based viscosity control agent may include one or more of a monosaccharide, a disaccharide, and a polysaccharide. The carbohydrate-based viscosity control agent may include one or more of sucrose, glucose, dextrose, fructose, galactose, maltose, lactose, cellulose, amalose, and starch. The carbohydrate-based viscosity control agent may include a polyhydric alcohol. The carbohydrate-based viscosity control agent may include one or more of mannitol, sorbitol, glycol, glycerol, erythritol, threitol, arabitol, xylitol, ribitol, galactitol, fucitol, inositol, volemitol, isomatol, maltitol, and lactitol. The carbohydrate-based viscosity control agent may include a polyhydric alcohol-based surfactant. The carbohydrate-based viscosity control agent may include one or more of polysorbate 20-(polyoxyethylene (20) sorbitan monolaurate), polysorbate 40-(polyoxyethylene (20) sorbitan monopalmitate), polysorbate 60-(polyoxyethylene (20) sorbitan monostearate), polysorbate 80-(polyoxyethylene (20) sorbitan monooleate), sorbitan monolaurate, sorbitan monopalmitate, sorbitan monostearate, and sorbitan monooleate The slurry may include between about 25 wt. % to about 70 wt. % magnesium hydroxide solids. The slurry may include between about 40 wt. % to about 60 wt. % magnesium hydroxide solids. The slurry may include between about 0.1 wt. % to about 15 wt. % of the carbohydrate-based viscosity control agent. The slurry may have a viscosity of between about 20 centipoise and about 600 centipoise after about 15 days.

According to another implementation, a method may include providing a magnesium compound. The method may also include providing sea water. The method may also include providing a carbohydrate-based viscosity control agent. The method may further include mixing the magnesium compound the sea water and the carbohydrate-based viscosity control agent to form a high solids slurry.

One or more of the following features may be included. Providing the magnesium compound and the carbohydrate-based viscosity control agent may include pre-blending the magnesium compound and the carbohydrate-based viscosity control agent. The magnesium compound may include a magnesium hydroxide powder. The magnesium compound may include a magnesium oxide powder. Mixing the magnesium compound, the sea water and the carbohydrate-based viscosity control agent may include hydrating the magnesium oxide powder to form magnesium hydroxide.

The high solids slurry may include between about 25 wt. % to about 70 wt. % magnesium hydroxide solids. The high solids slurry may include between about 40 wt. % to about 60 wt. % magnesium hydroxide solids. The high solids slurry may include between about 0.1 wt. % to about 15 wt. % of the carbohydrate-based viscosity control agent. The high solids slurry may exhibit a viscosity of between about 20 centipoise and about 600 centipoise after about 15 days.

The carbohydrate-based viscosity control agent may include one or more of a monosaccharide, a disaccharide, and a polysaccharide. The carbohydrate-based viscosity control agent may include one or more of sucrose, glucose, dextrose, fructose, galactose, maltose, lactose, cellulose, amalose, and starch. The carbohydrate-based viscosity control agent may include a polyhydric alcohol. The carbohydrate-based viscosity control agent may include one or more of mannitol, sorbitol, glycol, glycerol, erythritol, threitol, arabitol, xylitol, ribitol, galactitol, fucitol, inositol, volemitol, isomatol, maltitol, and lactitol. The carbohydrate-based viscosity control agent may include a polyhydric alcohol-based surfactant. The carbohydrate-based viscosity control agent may include one or more of polysorbate 20-(polyoxyethylene (20) sorbitan monolaurate), polysorbate 40-(polyoxyethylene (20) sorbitan monopalmitate), polysorbate 60-(polyoxyethylene (20) sorbitan monostearate), polysorbate 80-(polyoxyethylene (20) sorbitan monooleate), sorbitan monolaurate, sorbitan monopalmitate, sorbitan monostearate, and sorbitan monooleate The high solids slurry may be supplied to an exhaust emissions scrubber system. The exhaust emissions scrubber system may remove one or more sulfur compounds from an exhaust flow treated by the exhaust emissions scrubber system. The exhaust emissions scrubber system may be associated with a marine vessel.

The details of one or more implementations are set forth in the accompanying drawings and the description below. Other features and advantages will become apparent from the description, the drawings, and the claims.

DETAILED DESCRIPTION OF EXAMPLE EMBODIMENTS

Exhaust scrubbers may provide an attractive opportunity to allow commercial seagoing vessels to satisfy the MARPOL Annex VI regulations, while continuing to utilize less expensive fuels, and with minimal additional equipment, or equipment retrofitting. However the use of sodium hydroxide as an alkali agent for neutralizing acids resulting from the scrubbing process may present a variety of potential problems and potential safety hazards. Consistent with the present disclosure, it has been found that magnesium compounds, such as magnesium hydroxide, may be utilized as an alkali source in connection with exhaust emission scrubbers. In some embodiments, the magnesium compounds may be provided for use by the exhaust scrubbers as a magnesium hydroxide slurry in sea water. For example, magnesium hydroxide may be utilized as a suitable alkali compound for neutralizing acids that may be generated as a result of the exhaust emission scrubbing process. Further, the use of magnesium hydroxide as an alkali source for neutralizing acids generated during the exhaust scrubbing process may overcome, or at least reduce, some of the problems associated with the use of sodium hydroxide, as well as other alkali sources, such as lime and the like.

For example, magnesium compounds that may be used for forming the magnesium hydroxide slurry for neutralizing acids generated from the exhaust scrubbing process may include magnesium oxide (MgO) and/or magnesium hydroxide ($Mg(OH)_2$). By contrast to alkali materials, such as sodium hydroxide, magnesium oxide and magnesium hydroxide may generally be considered non-hazardous materials. By contrast, sodium hydroxide is generally considered to be a caustic and poisonous chemical product. As such, magnesium oxide and magnesium hydroxide may be safer for personnel that may handle, or otherwise come in contact with, the magnesium oxide and/or magnesium hydroxide materials. Similarly, magnesium oxide and/or magnesium hydroxide may generally be safer for the environment, e.g., in the event of a spill or leak that may make its way into the surface water around and/or outside of the marine vessel. Additionally, in some implementations, magnesium oxide powders and/or magnesium hydroxide powders may generally require less storage space in a ship's bunker area than some other alkali sources, such as sodium hydroxide. In some embodiments, a pre-produced aqueous magnesium hydroxide slurry product may also require less storage space in a ship's bunker area than alkali sources such as sodium hydroxide. In some implementations, the use of magnesium oxide and/or magnesium hydroxide in connection with exhaust scrubbing processes may result in comparatively less sludge volume from the centrifuge process. As such, magnesium oxide and/or magnesium hydroxide may result in less sludge that may need to be managed by the ship and eventually removed from the ship and disposed of. Magnesium oxide and magnesium hydroxide may also generally be non-corrosive to metal surfaces, includes metal components of the marine vessel, as well as metal components of storage and pumping equipment and metal components of exhaust scrubber systems.

Consistent with some aspects of the present disclosure, magnesium hydroxide (i.e., $Mg(OH)_2$) slurries may be utilized in connection with exhaust emission scrubbers. The magnesium compound utilized for forming the slurries may include a magnesium oxide material, or a magnesium hydroxide material, which may be provided in a powdered form, or may be converted to a powdered form prior to being developed to a slurry. The powdered magnesium compound may be mixed with the available sea water from the oceans traversed by the marine vessel. The magnesium hydroxide slurries may be used as an alkali for an exhaust scrubber system. However, the production of magnesium hydroxide slurries having a relatively high solids concentration may present various difficulties and challenges.

Magnesium hydroxide slurries may often be produced using a number of approaches. For example, dry magnesium oxide powder may be mixed and hydrated using potable water, followed by continued mixing to achieve a slurry. Magnesium hydroxide slurries may also be produced by extracting magnesium hydroxide from salt water or brine sources through precipitation with dolomitic lime. Further, approaches may include mixing powdered Brucite with water under various conditions. However, once magnesium hydroxide has been produced, it may generally have limited solubility in water. Therefore, in order to produce stable aqueous suspensions, or slurries, very high shear mixing devices and or dispersing agents may often be employed to control viscosity in a range below about 800 cps (centipoise), which may avoid difficulty in pumping the slurry. Stable slurries utilizing fresh water may be produced having relatively high magnesium hydroxide solids as high as 70 wt. % solids using appropriate high speed mixing, and/or using polymeric surfactants such as polyacrylamides and/or polyacrylic-type dispersing agents. However, such approaches, which may suitably be used with freshwater slurries, may generally not be viable for producing relatively high solids magnesium hydroxide slurries using sea water and/or saltwater (generally referred to herein as sea water, but the term should be construed as contemplating other saltwater sources).

Consistent with the present disclosure, relatively high solids magnesium hydroxide slurries in sea water may be formed. In some implementations, the magnesium hydroxide slurries may be used in connection with exhaust emission scrubbers, for example, to provide an alkali source for neutralizing acids that may be generated during the scrubbing process, and/or may be utilized in other processes associated with exhaust emission scrubbers. While exhaust emission scrubbers may be discussed in the context of marine vessels, it will be appreciated that magnesium hydroxide slurries may be used in connection with other exhaust scrubber processes.

According to some embodiments, a relatively high solids magnesium hydroxide slurry may be produced using sea water. The magnesium hydroxide slurry may include one or more magnesium hydroxide compounds. The slurry may further include sea water, and one or more carbohydrate-based viscosity control agents. In various embodiments, the magnesium hydroxide slurry may be formed by providing, and mixing, a magnesium compound, sea water, and a carbohydrate-based viscosity control agent to form the relatively high-solids magnesium hydroxide slurry in sea water. As described above, in some implementations, the magnesium hydroxide slurry in sea water may be used in connection with exhaust scrubbers, such as marine vessel exhaust emission scrubbers. For example, the magnesium hydroxide slurry may be used as a pH controlling agent to scrub sulfur dioxide gasses that may be emitted from the burning of sulfur containing bunker fuels used to propel ocean going vessels. In some embodiments, the magnesium hydroxide slurry may include a solids content as high as, or even greater than, about 70 wt. %. In some embodiments, the carbohydrate-based viscosity control agents may allow relatively high solids content to be achieved in an pumpable slurry. In an embodiment, the carbohydrate-based viscosity control agent may include one or more simple or complex sugars (e.g., mono-, di-, or poly-saccharide sugars), polyhydric alcohols, sugar or sugar substitute-based surfactants, or other related chemistries.

In general, the magnesium hydroxide compound in the slurry may include a powdered magnesium hydroxide compound. In an example, the powdered magnesium hydroxide compound may include powdered Brucite. Further, the magnesium hydroxide slurry may be produced from a compound that may form, or provide, magnesium hydroxide in slurry. For example, the magnesium hydroxide compound in the slurry may include hydrated magnesium oxide. As such, the magnesium compound that may be mixed with the sea water and the carbohydrate-based viscosity control agent may include any magnesium compound that includes magnesium hydroxide and/or any magnesium compound that may be reacted, before, during, or after mixing with one or more of sea water and the carbohydrate-based viscosity control agent to form magnesium hydroxide. For example, in an embodiment, magnesium oxide may be hydrated to provide magnesium hydroxide. In an embodiment, the magnesium oxide may be hydrated prior to mixing with one or more of the sea water and the carbohydrate-based viscosity control agent. In such an embodiment, the magnesium oxide may be hydrated using freshwater and/or using sea water. In an embodiment, the magnesium oxide may be hydrated during, after, and/or as a result of mixing with one or more of the sea water and the carbohydrate-based viscosity control agent. In one particular embodiment, the magnesium oxide may be hydrated, at least in part, by the sea water used for producing the magnesium hydroxide slurry. In such an embodiment, the magnesium oxide may be hydrated by the sea water before, during, and/or after mixing with the carbohydrate-based viscosity control agent.

According to an illustrative example, in attempting to maximize magnesium hydroxide efficiencies as it relates to slurry production, the mode of mechanism associated with the scrubbing of sulfur compounds from exhaust emissions may be considered. Without being limited to the following description, three series of reactions are believed to occur in the magnesia scrubbing-regeneration process. In the first series, the following reactions are believed to predominate. In the example understanding, sulfur dioxide absorption is represented by the formation of magnesium sulfite hexahydrate followed by its further reaction with sulfur dioxide to form magnesium bisulfite, as detailed in reactions 1-3:

Reaction 1—Sulfur Dioxide Adsorption Resulting in Formation of Sulfite Hexahydrate:

$$SO_2 + Mg(OH)_2 + 5H_2O \rightarrow MgSO_3 \cdot 6H_2O \downarrow$$

Reaction 2—Formation of Magnesium Bisulfite from Sulfite Hexadydrate:

$$SO_2 + MgSO_3 \cdot 6H_2O \rightarrow Mg(HSO_3)_2 + 5H_2O$$

Reaction 3—Magnesium Bisulfite Neutralization is Represented by the Following Reaction:

$$Mg(HSO_3)_2 + Mg(OH)_2 + 4H_2O \rightarrow 2MgSO_3 \cdot 6H_2O \downarrow$$

Once magnesium bisulfite is produced from the scrubber reactions, the $SO_2$ gas may be safely neutralized and may no longer present the threat of $SO_2$ emissions into the atmosphere and may no longer be susceptible to conversion to sulfuric acid. While the foregoing is believed to represent reactions involved in the process of scrubbing sulfur compounds from exhaust emissions, it will be appreciated that various additional and/or alternative reactions may occur. As such, the foregoing should not be construed as a limitation on the present disclosure.

The grade of the magnesium oxide utilized for producing the slurry may be a factor effecting the performance of the scrubbing process. In particular, the grade of the magnesium oxide may be important to achieve relatively fast conversion of the magnesium oxide to magnesium hydroxide scrub $SO_2$ from scrubbers that use sea water as the hydration source. Accordingly, a relatively highly reactive grade of magnesium oxide may be desirable. In some implementations, a lighter burned magnesium oxide with relatively high surface area may be desirable. On possible suitable magnesium oxide material may include a magnesium oxide product marketed as MAGOX 93HR NW, which may be available from Premier Magnesia, LLC.

In an embodiment, magnesium compounds may be utilized having a relatively high degree of purity. In an example embodiment, magnesium compounds may be provided having an alkaline magnesium oxide and/or alkaline magnesium hydroxide purity of between about 85% to about 100% pure alkaline magnesium oxide and/or magnesium hydroxide. In an illustrative embodiment, a magnesium compound may be provided having an alkaline magnesium oxide and/or alkaline magnesium hydroxide purity of between about 98% to about 98% pure alkaline magnesium oxide and/or magnesium hydroxide.

In an embodiment, a magnesium compound may be provided having a desired reactivity. A magnesium compound having a relatively higher reactivity may provide more complete an efficient use within a desired application. In an embodiment, specific surface area ("SSA") of the magnesium compound may be correlated to reactivity, e.g., in which a relatively higher specific surface area may be correlated to a relatively higher reactivity. In some embodiments, a magnesium compound may exhibit a specific surface area of between about 9 $m^2/g$ to about 300 $m^2/g$. For example, in an example embodiment, a magnesium compound may have a specific surface area in the range of between about 15 $m^2/gram$ to about 200 $m^2/gram$. It will be appreciated that magnesium compounds (including magnesium oxide compounds and magnesium hydroxide compounds, as well as other suitable magnesium compounds) having differing specific surface areas may also be utilized.

In some embodiments, it may be desirable to produce magnesium hydroxide slurries with solids contents of at least 50 wt. % when using sea water to mix with and hydrate powdered magnesium oxide or Brucite (e.g., powdered magnesium hydroxide). Achieving slurries having approximately 50 wt. % solids or higher does not appear to have been accomplished before when using sea or salt water. Consistent with various embodiments of the present disclosure, magnesium compound slurries may be formed having greater than about 25 wt. % magnesium hydroxide solids. Further, in some embodiments, magnesium compound slurries may be formed including between about 25 wt. % to about 70 wt. % magnesium hydroxide solids. In some particular embodiments, magnesium compound slurries may be provided having between about 40 wt. % to about 60 wt. % magnesium hydroxide solids.

Relatively high solids magnesium hydroxide slurries in sea water may utilize one or more carbohydrate-based viscosity control agents. The one or more carbohydrate-based viscosity control agents may allow relatively higher concentrations of solids to be suspended in the slurry. Various tests were conducted to evaluate the comparative solids capacity achievable in magnesium hydroxide slurries using sea water and using freshwater. During the course of the testing, several 1,400 g test batches of MAGOX 93HR NW, which may be available from Premier Magnesia, LLC, were mixed in an insulated reactor pot. Sea water was obtained and was maintained at ambient temperatures in the lab (72° F.). Tap water (i.e., freshwater) was heated to 110° F. Various dispersing agents or viscosity modifiers were tested in both the sea water as well as tap water for comparative analysis vs. controls (sea or tap water without any dispersant). All batches were mechanically stirred for a minimum of 4 hours. After mixing, all batches were measured for viscosity change over several time intervals. Additionally, any visible changes were also noted. The initial results are found in Table 1 below:

TABLE 1

|  | % MODIFIER Dry Basis | | Solids | VISCOSITY CPS | | | |
|---|---|---|---|---|---|---|---|
| — | MgO | Mg(OH)₂ | % | Made | 24 hrs. | 48 hrs. | Days ( ) | COMMENTS |
| TAP WATER | NONE |  | 50.7 |  | 32 | 32 | 48 (15) | Very Stiff Sediment |
| SEA WATER | NONE |  | 52.5 |  | 734 | >1000 | >1000 | Soft Sediment |

TABLE 1-continued

| | % MODIFIER Dry Basis | | Solids | VISCOSITY CPS | | | | |
|---|---|---|---|---|---|---|---|---|
| | MgO | Mg(OH$_2$) | % | Made | 24 hrs. | 48 hrs. | Days ( ) | COMMENTS |
| SUCROSE | 13.0 | 9.1 | 51.1 | 38 | 35 | 38 | 51 (11) (15) | Soft. Easy to re-suspend. |
| SUCROSE | 3.0 | 2.1 | 52.8 | 38 | 44 | 43 | 145 (9) | Soft. Easy to re-suspend. |
| GLUCOSE | 2.0 | 1.4 | 50.6 | 41 | 41 | 66 | 224 (3) | Sediment Soft but full of Lumps. 1/8" 80° F. |
| MgCl$_2$•6H$_2$O | 5.0 | 3.5 | | 276 | >1000 | | | |
| FLOSPERSE | 4.4 | 3.1 | 49.3 | 55 | 54 | | 98 (3) | |
| SULFAMIC ACID | 7.7 | 5.4 | | >1000 | | | | Violent Boil |

NOTE:
All data was obtained using 1400 g batches produced in an insulated reactor pot. Sea water was about 72° F., Tap water was 110° F. and MgO powder was about 60° F. All batches were mechanically stirred for a minimum of 4 hours.

Consistent with the foregoing tests, when sea water is used to hydrate magnesium oxide, the use of proper levels of carbohydrate-based sugars (specifically sucrose and glucose in this test) may be capable of maintaining slurry viscosities under 55 CPS (centipoise) after at least 10 days. As observed by the testing, other viscosity modifiers and/or dispersing agents that have been reported to be effective in freshwater (e.g., tap water) slurry production did not provide desired results. For example, in the above test, polyacrylic/polyamide copolymer dispersants, hydrated magnesium chloride and sulfamic acids either failed to suppress viscosities down to desired levels, were uneconomical, created unworkable sedimentation, formed lumps, or resulted in undesirable heat releases. Accordingly, as demonstrated by the testing, carbohydrate-based viscosity control agents, including simple sugars like sucrose and glucose, were successful in maintaining lower slurry viscosities without any noted physical limitations.

While not forming a limitation on the present disclosure, it is believed that the viscosity of the magnesium hydroxide slurries increases when sea water is used based upon, at least in part, the introduction of sulfate, chloride and other salts found in sea water. Based upon a sea water analysis, the major salt components found in sea water included: sodium chloride, sodium sulfate, calcium chlorides and sulfates, magnesium chlorides and sulfates. It is noted that sea water may include additional components. It is believed that carbohydrate-based viscosity control agents (e.g., including sugars and sugar-based additives) may prevent viscosity increases via chelation or sequestration of $Mg^{+2}$, $Ca^{+2}$, $Na^{+1}$ ions, as well as chelation or sequestration of sulfate ($SO^{+3}$) and chloride ($Cl^{-1}$) ions. By chelation, or sequestration, of these ions, the salts may be kept from causing significant viscosity increases and may help disperse or suspend the magnesium oxide or magnesium hydroxide particles. Various additional and/or alternative mechanisms may be involved.

Based upon, at least in part, the understanding that salts and salt breakdown ions may cause the viscosity increase of magnesium hydroxide slurries when sea water is used, it is further believed that ion exchange resins and/or portable desalination units that may be utilized on marine vessels may also be utilized to provide magnesium hydroxide slurries having reduced viscosities.

Based upon, at least in part, initial testing and understandings, additional examination was conducted to refine the levels of carbohydrate-based viscosity control agents (e.g., such as sugars, sugar substitutes as well as commercially available surfactants based on sugars and polyhydric alcohols) to effectively control the viscosity of the magnesium hydroxide slurries in sea water. Acknowledging that all sea waters may not include the same composition, some simple sugars, as tested, may be less effective in other sea water conditions.

In an embodiment, the carbohydrate-based viscosity control agent may include one or more of a monosaccharide, a disaccharide, and a polysaccharide. For, example, during testing it was found is that monosaccharides, disaccharides and polysaccharides may be utilized to positively maintain the viscosity of relatively high solids magnesium hydroxide slurries in sea water to under 55 cps after 10 days of testing. Further, the carbohydrate-based viscosity control agent may include one or more of sucrose, glucose, dextrose, fructose, galactose, maltose, lactose, cellulose, amalose, and starch. For example, monosaccharides that have been identified as being useful as dispersing agents/viscosity control agents may include glucose, fructose and galactose with the general formula $C_6H_{12}O_6$. The example monosaccharides have five hydroxyl groups (—OH) and a carbonyl group (C=O) and are cyclic when dissolved in water. The example monosaccharides may exist as several isomers with dextro- and laevo-rotatory forms. Therefore, dextrose may also be effective.

Disaccharides, or compound sugars, that have been identified as providing satisfactory results may include sucrose, maltose, and lactose with the general formula $C_{12}H_{22}O_{11}$. Such disaccharides may be formed by the combination of two monosaccharide molecules with the exclusion of a molecule of water. Further, some polysaccharides may also provide the desired results. Potentially suitable polysaccharides may contain more than ten monosaccharide units. The polysaccharide starch (a polymer of glucose) is used as a storage polysaccharide in plants, being found in the form of both amylose and the branched amylopectin. Such polysaccharide may be suitably used for the applications of viscosity control of sea water slurries with magnesium hydroxide. It will be appreciated that various additional and/or alternative mono-, di-, and poly-saccharides may also suitably be utilized in embodiments consistent with the present disclosure.

In addition/as an alternative to mono-, di-, and poly-saccharides, in some implementations, the carbohydrate-based viscosity control agent may include a polyhydric alcohol. Polyhydric alcohols (e.g., sugar alcohols) are used as sugar substitutes in the food and beverage industry. In general, acyclic linear polyhydric alcohols may be considered sugars in which the aldehydic group of the first carbon atom is reduced to a primary alcohol. Such polyhydric alcohols may be classified according to the number of hydroxyl groups in the molecule. Of these, sorbitol (D-glucitol, sorbite) may comparatively experience the most widespread use of all the naturally occurring sugar alcohols. Further, sorbitol may be utilized to control viscosity of magnesium hydroxide slurries using sea water, consistent with the present disclosure. Other chemical derivatives of sugars, called polyols, that differ from the parent compounds in having an alcohol group ($CH_2OH$) instead of the aldehyde group (CHO), may also suitably be utilized as a carbohydrate-based viscosity control agent. Examples of such polyhydric alcohol carbohydrate-based viscosity control agents may include, but are not limited to, mannitol from mannose, xylitol from xylose, lactitol from lactulose, as well as sorbitol, isomalt, and hydrogenated glucose syrup.

The carbohydrate-based viscosity control agent may include a polyhydric alcohol-based surfactant. In general, there may be two classes of surfactants that may be useful as carbohydrate-based viscosity control agents consistent with the present disclosure. The two classes of polyhydric alcohol-based surfactants may be based upon polysorbates and ethoxylated polysorbases, which may both be nonionic surfactants. In general, these nonionic surfactants may primarily include emulsifiers that may be used in pharmaceuticals, food preparation and may also be used in cosmetics to solubilize essential oils into water-based products. Polysorbates may be derived from PEG-ylated sorbitan (e.g., a derivative of sorbitol) esterified with fatty acids. Common brand names for polysorbates include Alkest, Canarcel, and Tween. Four common PEG (Polyethylene glycol) esters which may be utilized as carbohydrate-based viscosity control agents may include polysorbate 20-(polyoxyethylene (20) sorbitan monolaurate), polysorbate 40-(polyoxyethylene (20) sorbitan monopalmitate), polysorbate 60-(polyoxyethylene (20) sorbitan monostearate) and polysorbate 80-(polyoxyethylene (20) sorbitan monooleate). The number 20 following the polyoxyethylene part refers to the total number of oxyethylene —($CH_2CH_2O$)— groups found in the molecule. The number following the polysorbate part may be related to the type of fatty acid associated with the polyoxyethylene sorbitan part of the molecule. Monolaurate is indicated by 20, monopalmitate is indicated by 40, monostearate by 60 and monooleate by 80.

In addition to ethoxylated polyhydric alcohol-based surfactants, various non-ethoxylated polyhydric alcohol-based surfactants may also be used as carbyhydrate-based viscosity control agents consistent with the present disclosure. Non-ethoxylated, sorbitan fatty acid esters may have the common brand name of Span. Such non-ethoxylated polyhydric alcohol-based surfactants may include sorbitan monolaurate, sorbitan monopalmitate, sorbitan monostearate, sorbitan tristearate and sorbitan monooleate. Consistent with one aspect, suitable polyhydric alcohol-based surfactants may include fatty acid esters of both the exthoxylated and non-ethoxylated versions of each surfactant class. This may be the premise of the HLB (Hydrophobic Lipophilic Balance) system of emulsification. In the case of making salt water slurries of magnesium hydroxide, some experimentation may be necessary to determine which blend of fatty acid versions may provide desired results. The exact blend of fatty acid versions may depend, at least in part, on the ionic chemical composition of the sea water, pH and concentration of the desired solids concentration.

In various implementations, the slurry may include between about 0.1 wt. % to about 15 wt. % of the carbohydrate-based viscosity control agent. Further, in some particular embodiments, the slurry may include between about 0.5 wt. % to about 4.0 wt. % of the carbohydrate-based viscosity control agent. It will be appreciated that the exact quantity of the carbohydrate-based viscosity control agent may vary based upon, for example, on or more of the desired magnesium hydroxide solids concentration, the exact carbohydrate-based viscosity control agent utilized, the chemical composition of the sea water, pH, as well as various additional and/or alternative considerations.

The slurry may have a viscosity of between about 20 centipoise and about 600 centipoise after about 15 days. Achieving a viscosity of the magnesium hydroxide slurry within this range may allow satisfactory pumping and conveyance of the slurry, e.g., to allow circulating through the scrubber system and to provide for adequate reaction between the magnesium hydroxide and the exhaust emission components. The exact desired viscosity of the magnesium hydroxide slurry may vary, for example, based upon the pumping and conveyance system, the structure of the scrubber system, the structure of the centrifuge system used to separate sludge components from the reacted slurry, as well as various additional and/or alternative considerations.

Providing the magnesium compound and the carbohydrate-based viscosity control agent may include pre-blending the magnesium compound and the carbohydrate-based viscosity control agent. For example, in some embodiments the carbohydrate-based viscosity control agent may include a powdered or dry product. In such an implementation, the carbohydrate-based viscosity control agent may be pre-blended with the magnesium compound. In some such embodiments, the pre-blended magnesium compound and carbohydrate-based viscosity control agent may be provided as a single component. During use, the pre-blended magnesium compound and carbohydrate-based viscosity control agent may be mixed with sea water to provide the desired magnesium hydroxide slurry for use with the exhaust emission scrubber systems. Further, as the magnesium hydroxide reacts with exhaust emission compounds, the alkalinity of the scrubber liquor may be replenished, e.g., through the addition of the magnesium compound, and/or the pre-blended magnesium compound and carbohydrate-based viscosity control agent to the scrubber liquor. In addition/as an alternative to pre-blending the magnesium compound and the carbohydrate-based viscosity control agent, the magnesium compound and the carbohydrate-based viscosity control agent may be separately added into the scrubber system (e.g., which may include the magnesium hydroxide slurry). For example, the carbohydrate-based viscosity control agent may be added separately into the scrubber system after the introduction of the magnesium compound (e.g., magnesium oxide or magnesium hydroxide) with sea water.

In some embodiments, the sea water may include sodium chloride salt contents in the range of between about 1.0 wt. % to about 4.5 wt. %. In some embodiments, desalination systems may be utilized to remove at least a portion of salts and/or ions from the sea water prior to mixing the sea water with the magnesium compound. Accordingly, in some embodiments, the sodium chloride content of the sea water may be reduced, and/or other salts or ions in the sea water may be removed or reduced. In a generally similar manner, ion exchange resins may be used to pre-filter the sea water, prior to mixing with the magnesium compounds. In some such embodiments, higher concentration magnesium hydroxide concentrations (e.g., higher magnesium hydroxide solids wt. % in the slurry) may be achieved, and/or the quantity of carbohydrate-based viscosity control agent necessary to achieve the desired magnesium hydroxide solids content may be reduced.

As generally described above, the magnesium hydroxide sea water slurry may be used as a pH control additive for exhaust emission scrubber systems. In some particular implementations, the magnesium hydroxide sea water slurry may be used in marine vessel exhaust scrubber systems for controlling, and/or reducing, sulfur oxide (e.g., SOx) emissions into the atmosphere. In some embodiments, the SOx emissions may be reduced to an acceptable level (e.g., based upon, at least in part, MARPOL Annex VI standards and regulations) for marine vessels burning relatively higher sulfur containing fuels for ocean or sea water going vessels, such as cruise ships, commercial vessels, commuter transport sea vessels such as ferries, and other related sea water traversing vessels. Example scrubber systems may include venturi scrubber systems, randomly packed scrubber systems, closed loop scrubber systems, open loop scrubber systems, and/or other types of scrubber systems. In some embodiments, the scrubber systems may be utilized to remove SOx emissions from engines burning bunker fuel, with SOx levels ranging from 3.5% to 0.1%. Sulfur containing compounds that may be removed using such scrubber systems may include, but are not limited to, sulfites ($SO_2$), sulfates ($SO_3$), or sulfur compounds.

Consistent with some embodiments of the present disclosure, improvements may be provided in magnesium oxide and/or magnesium hydroxide conversion technology, e.g., which may be utilized in connection with improved scrubber systems. For example, conventionally when mixing and hydrating the magnesium oxide or Brucite powder with sea water, the produced magnesium hydroxide slurry may reach a viscosity threshold, where it may begin to form gels and become too high in viscosity for practical use. The threshold level in wt. % solids of the produced slurry may often be reached at close to 30 wt. %, or lower, above which the slurry viscosity may significantly increase. The increase in viscosity may adversely impact the pumpability of the slurry. Consistent with the present disclosure, a magnesium hydroxide slurry including greater than 25 wt. % magnesium hydroxide solids, and even including 50 wt. % higher magnesium hydroxide solids may be produced, while maintaining a viscosity the permits useful pumpability of the slurry. In some implementations, the higher percent conversion of the magnesium oxide to magnesium hydroxide may provide a higher concentration of magnesium hydroxide, which may be the component that scrubs the $SO_2$ via neutralization of the produced acid in an exhaust emissions scrubber. By achieving greater magnesium hydroxide conversion, the magnesium oxide efficiency may be increased. One possible major benefit of making higher solids magnesium hydroxide slurry may be that less storage space may be required for the powdered raw material. The reduction in required storage space may be especially advantageous in marine vessels, in which storage space may be very limited onboard ocean vessels, especially in engine room compartments. As such, embodiments of the present disclosure, may allow for higher solids slurries that maintain desired viscosity properties and minimize the conversion of valuable passenger spaces into special areas required for the scrubber equipment components on a ship.

A number of implementations have been described. Nevertheless, it will be understood that various modifications may be made. Accordingly, other implementations are within the scope of the following claims.

What is claimed is:
1. A composition comprising:
a slurry including:
a magnesium hydroxide compound;
sea water; and
a carbohydrate-based viscosity control agent;
wherein the slurry includes between about 25 wt. % to about 70 wt. % magnesium hydroxide solids.
2. The composition of claim 1, wherein the magnesium hydroxide compound includes powdered magnesium hydroxide.
3. The composition of claim 1, wherein the magnesium hydroxide compound includes hydrated magnesium oxide.
4. The composition of claim 1, wherein the carbohydrate-based viscosity control agent includes one or more of a monosaccharide, a disaccharide, and a polysaccharide.
5. The composition of claim 4, wherein the carbohydrate-based viscosity control agent includes one or more of sucrose, glucose, dextrose, fructose, galactose, maltose, lactose, cellulose, amalose, and starch.
6. The composition of claim 1, wherein the carbohydrate-based viscosity control agent includes a polyhydric alcohol.
7. The composition of claim 6, wherein the carbohydrate-based viscosity control agent includes one or more of mannitol, sorbitol, glycol, glycerol, erythritol, threitol, arabitol, xylitol, ribitol, galactitol, fucitol, inositol, volemitol, isomatol, maltitol, and lactitol.
8. The composition of claim 1, wherein the carbohydrate-based viscosity control agent includes a polyhydric alcohol-based surfactant.
9. The composition of claim 8, wherein the carbohydrate-based viscosity control agent includes one or more of polysorbate 20-(polyoxyethylene (20) sorbitan monolaurate), polysorbate 40-(polyoxyethylene(20) sorbitan monopalmitate), polysorbate 60-(polyoxyethylene (20) sorbitan monostearate), polysorbate 80-(polyoxyethylene (20) sorbitan monooleate), sorbitan monolaurate, sorbitan monopalmitate, sorbitan monostearate, and sorbitan monooleate.
10. The composition of claim 1, wherein the slurry includes between about 40 wt. % to about 60 wt. % magnesium hydroxide solids.
11. The composition of claim 1, wherein the slurry includes between about 0.1 wt. % to about 15 wt. % of the carbohydrate-based viscosity control agent.
12. The composition of claim 1, wherein the slurry has a viscosity of between about 20 centipoise and about 600 centipoise after about 15 days.
13. A method comprising:
providing a magnesium compound;
providing sea water;
providing a carbohydrate-based viscosity control agent; and
mixing the magnesium compound the sea water and the carbohydrate-based viscosity control agent to form a high solids slurry; wherein the slurry includes between about 25 wt. % to about 70 wt. % magnesium hydroxide solids.
14. The method of claim 13, wherein providing the magnesium compound and the carbohydrate-based viscosity control agent includes pre-blending the magnesium compound and the carbohydrate-based viscosity control agent.
15. The method of claim 13, wherein the magnesium compound includes a magnesium hydroxide powder.
16. The method of claim 13, wherein the magnesium compound includes a magnesium oxide powder.
17. The method of claim 16, wherein mixing the magnesium compound, the sea water and the carbohydrate-based viscosity control agent includes hydrating the magnesium oxide powder to form magnesium hydroxide.

18. The method of claim 13, wherein the high solids slurry includes between about 40 wt. % to about 60 wt. % magnesium hydroxide solids.

19. The method of claim 13, wherein the high solids slurry includes between about 0.1 wt. % to about 15 wt. % of the carbohydrate-based viscosity control agent.

20. The method of claim 13, wherein the high solids slurry exhibits a viscosity of between about 20 centipoise and about 600 centipoise after about 15 days.

21. The method of claim 13, wherein the carbohydrate-based viscosity control agent includes one or more of a monosaccharide, a disaccharide, and a polysaccharide.

22. The method of claim 21, wherein the carbohydrate-based viscosity control agent includes one or more of sucrose, glucose, dextrose, fructose, galactose, maltose, lactose, cellulose, amalose, and starch.

23. The method of claim 13, wherein the carbohydrate-based viscosity control agent includes a polyhydric alcohol.

24. The method of claim 23, wherein the carbohydrate-based viscosity control agent includes one or more of mannitol, sorbitol, glycol, glycerol, erythritol, threitol, arabitol, xylitol, ribitol, galactitol, fucitol, inositol, volemitol, isomatol, maltitol, and lactitol.

25. The method of claim 13, wherein the carbohydrate-based viscosity control agent includes a polyhydric alcohol-based surfactant.

26. The method of claim 25, wherein the carbohydrate-based viscosity control agent includes one or more of polysorbate 20-(polyoxyethylene(20) sorbitan monolaurate), polysorbate 40-(polyoxyethylene(20) sorbitan monopalmitate), polysorbate 60- (polyoxyethylene(20) sorbitan monostearate), polysorbate 80-(polyoxyethylene (20) sorbitan monooleate), sorbitan monolaurate, sorbitan monopalmitate, sorbitan monostearate, and sorbitan monooleate.

* * * * *